Feb. 16, 1932.                W. H. REES                1,845,557
                           WEIGHING APPARATUS
                          Filed Sept. 26, 1927
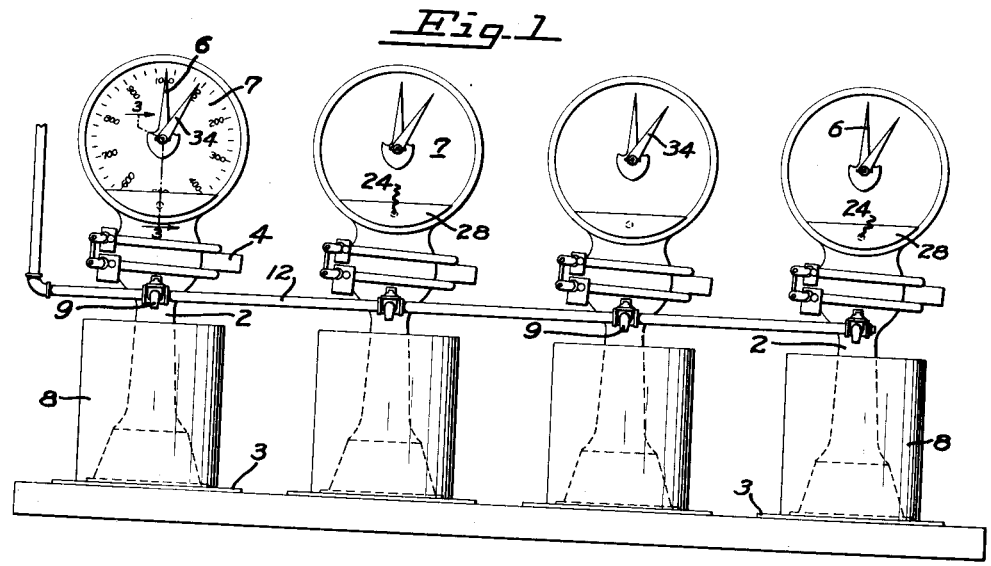
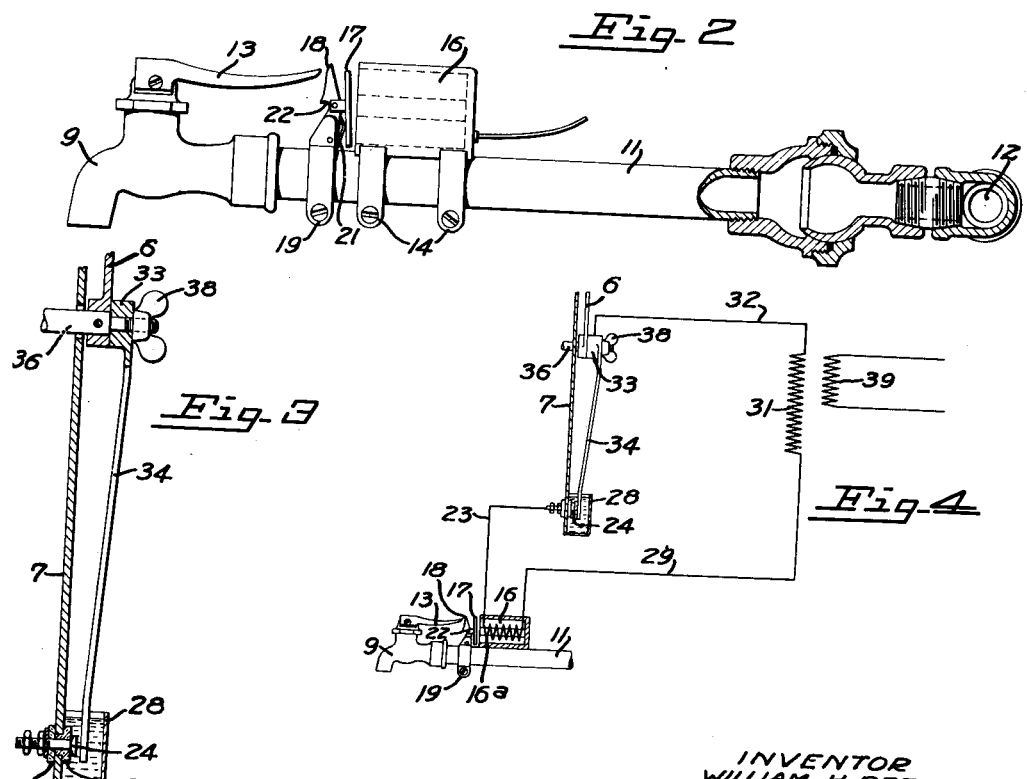
INVENTOR
WILLIAM H. REES
BY Charles A. Evans
HIS ATTORNEY.

Patented Feb. 16, 1932

1,845,557

UNITED STATES PATENT OFFICE

WILLIAM H. REES, OF BERKELEY, CALIFORNIA

WEIGHING APPARATUS

Application filed September 26, 1927. Serial No. 222,041.

My invention relates to weighing devices in which predetermined loads of flowable substances are weighed, and the broad object of the invention is to provide means for cutting off further flow of material after the predetermined load has been reached.

Another object of the invention is to provide an apparatus of the character described which is especially adapted for weighing predetermined amounts of liquid substances.

Another object of the invention is to provide an aparatus of the character described in which is embodied improved electrical means for controlling the flow of material.

Another object of the invention is to provide a plurality of devices of the character described; so as to permit one attendant to take care of all of them at one time.

Other objects of the invention, together with the foregoing will be set forth in the following description of my preferred embodiment of means for practicing the invention and which is illustrated in the drawings accompanying and forming part of the specification. It is to be understood that I do not limit myself to the showing made by said description and drawings as I may adopt variations of n.y preferred form within the scope of my invention as set forth in the claims.

Referring to the drawings:

Figure 1 is a front elevation of the weighing apparatus. a number of machines being shown for simultaneous use.

Figure 2 is a side elevation of portions of the apparatus, a part being shown in section to disclose the construction.

Figure 3 is a section taken in a plane indicated by the line 3—3 of Figure 1, the auxiliary arm being moved to a different position than that in Figure 1.

Figure 4 is a view in elevation of portions of the apparatus, including a diagrammatic representation of the control circuits.

In terms of broad inclusion, my invention comprises mechanism correlated for use with a weighing apparatus, such as a valve from which material to be weighed is discharged into a drum placed on the platform of a suitable weighing machine. Mounted for movement with a movable element of the machine, which for convenience may be the pointer pivoted to move across the face of the dial, is an auxiliary arm having an electrode. As the arm moves it varies a gap, in an electric circuit, between its electrode and a stud forming a second electrode. When the arm registers with the stud and the electrodes are in a position of approximately minimum gap, a spark is discharged. The discharge of the spark varies the electrical characteristics of certain related circuits to initiate the operation of a translating device, which causes the valve to shut; thereby preventing further flow of material onto the scale.

In order to weigh predetermined loads of material, the stud is fixed and means are provided for adjusting the position of the auxiliary arm relative to that of the pointer; so that when the pointer is in zero position, the arm may be positioned any place between it and the stud.

In greater detail my invention comprises a weighing machine of suitable construction having the support 2, weighing platform 3, tare beam 4, pointer 6 and dial 7. In Figure 1 are shown a plurality of weighing devices adapted for use together, and upon each one of the weighing platforms 3 are placed drums 8 into which a liquid is discharged by means of valves 9 connected by pipes 11 to a common supply pipe 12. The connection between pipes 11 and 12 is thru a conventional ball and socket joint, shown in Figure 2; so that the valve may be moved about if desired. The pipes are preferably held by supports 2, but independent supporting means may be provided. It is preferred to use "periflex valves" of the type in which the valve is closed when the handle 13 is yieldingly held in a released position, by means of a spring. Upon depression of the handle, the valve is open as long as the handle is held, but when released, it will spring back to shut the valve.

Means are provided for holding the valve in a depressed position and automatically shutting it after a predetermined amount of liquid is weighed, and means are also provided for setting the apparatus to weigh predetermined amounts. Upon the pipe 11 and adjacent the valve is mounted, by means of clamps 14, an electromagnet 16 adapted to attract an armature 17. The armature is fixed to a latch 18 which is pivotally mounted on the clamp 19 fixed to the pipe 11. The latch is held toward the valve by means of a spring 21 and has a notch 22 adapted to engage the end of handle 13 when it is depressed, and thus hold the valve open.

One end of the electromagnet core winding 16a is connected by means of a lead 23 to the inner end of a stud forming an electrode 24, which is preferably fixed to the dial 7. at the 500 lb. mark, and is insulated therefrom by means of the bushing 26 on the outer side of the dial and the insulating washer 27 on the inner side thereof. Preferably, the electrode is immersed in oil held in the pan 28 on the outside of the dial.

The other end of the electromagnet core winding is connected by means of a lead 29 to one side of the secondary coil 31 of a transformer, and the other side of the secondary coil is connected by a lead 32 to a hub 33 of the auxiliary arm 34, the tip of which acts as a second electrode, and which is journaled for rotation about the rotatable shaft 36, upon which the scale pointer 37 is fixed. In order to adjustably fix the position of arm 34 relative to that of the pointer, a wing nut 38 threaded onto the end of the shaft 36 is adapted to clamp the auxiliary arm between it and the pointer.

Inductively coupled to the secondary coil 31 of the transformer is a primary coil 39, which is connected by leads to any source of alternating current supply. The proportions between the coils 31 and 39 are such that with a voltage of 110 in the primary circuit, a potential of 2000 volts will be induced in the secondary coil 31.

Operation: It is thus seen that when the valve 9 is opened, and it is held in that position by the latch 18 engaging the handle 13, liquid will flow into the drum 8 on the platform 3. As this occurs, the scale pointer moves together with the auxiliary arm 34. When the tip of the arm registers with the stud 24; so that the electrodes are at approximately minimum gap, a spark passes between the electrodes, causing a momentary energization of the electromagnet 16. The armature 17 is attracted and with it the latch; so that the handle is released and the valve is shut.

Since the auxiliary arm is movably mounted and its position can be fixed relative to that of the pointer, predetermined weights may be measured. For example, if it is desired to weigh exactly 500 lbs., the auxiliary arm is set at zero with the empty drum on the platform, and when it swings past the fixed electrode at the 500 lb. mark, the valve is shut, preventing further discharge of the liquid onto the scale platform. If it is desired to weigh less than 500 lbs., for instance 100 lbs., the arm is moved to the 400 lb. mark, and when it passes the 500 lb. mark, the valve is shut. If more than 500 lbs. is the weight desired, such as 700 lbs., the arm is set at the 800 lb. mark. However, if more than 1000 lbs. is the weight desired, use is made of the tare beam 4, and the arm is then adjusted according to the set weight of the tare beam.

Inasmuch as the apparatus is entirely automatic after having once been set, it is apparent that one attendant can take care of a plurality of these devices.

The object of immersing the fixed electrode in an oil bath is to prevent the possibility of igniting the fumes of explosive substances, such as gasoline, which might be weighed, or dust mixtures of an explosive nature.

I claim:

1. In combination with an apparatus having an index element movable in accordance with variable factors related to the operation of the apparatus, an arm mounted for movement with said element, a stud control mechanism correlated for use with said apparatus, and automatic means under control of said arm and stud for actuating said mechanism when the arm registers with the stud.

2. In combination with an apparatus having an index element movable in accordance with variable factors related to the operation of the apparatus, an arm mounted for movement with said element, a stud, control mechanism correlated for use with said apparatus, and electrical means under control of said arm and stud for actuating said mechanism when the arm registers with the stud.

3. In combination with an apparatus having an element movable in accordance with variable factors related to the operation of the apparatus, an arm mounted for movement therewith and having an electrode, a second electrode separated from the first electrode by a variable gap, mechanism correlated for use with said apparatus, and electrical means under control of said arm and stud for actuating said mechanism when the electrodes are in a position of approximately minimum gap.

4. In combination with an apparatus having an element movable in accordance with variable factors related to the operation of the apparatus, an arm mounted for movement therewith and having an electrode, a second electrode separated from the first electrode by a variable gap, mechanism correlated for use with said apparatus, a circuit including said electrodes, a translating device in said circuit for actuating the mechanism when the electrodes are in a position of approximately minimum gap, and a second circuit inductively coupled to said first circuit.

5. In combination with an apparatus having an element movable in accordance with variable factors related to the operation of the apparatus, an arm mounted for movement with said element, means for adjustably fixing the position of said arm relative to that of the element, a stud, mechanism correlated for use with the apparatus, and automatic means under control of said arm and stud for actuating said mechanism when the arm registers with the stud.

6. In combination with an apparatus having an element movable in accordance with variable factors related to the operation of the apparatus, an arm mounted for movement with said element, means for adjustably fixing the position of said arm relative to that of the element, a fixed stud, mechanism correlated for use with the apparatus, and automatic means under control of said arm and stud for actuating said mechanism when the arm registers with the stud.

7. In combination with a weighing machine having an index element movable in accordance with the load thereon, an arm mounted for movement with the element, a stud, control mechanism correlated for use with said machine, and automatic means under control of said arm and stud for actuating said mechanism when the arm registers with the stud.

8. In combination with a weighing machine having an index element movable in accordance with the load thereon, an arm mounted for movement with the element, a stud, control mechanism correlated for use with said machine, and electrical means under control of said arm and stud for actuating said mechanism when the arm registers with the stud.

9. In combination with a weighing machine having a pivotally mounted index element movable in accordance with the load thereon, an arm mounted for movement with the element, a stud, control mechanism correlated for use with said machine, and automatic means under control of said arm and stud for actuating said mechanism when the arm registers with the stud.

10. In combination with a weighing machine having a pivotally mounted element movable in accordance with the load thereon, an arm mounted for movement with the element, means for adjustably fixing the position of said arm relative to that of the element, a stud, mechanism correlated for use with said machine, and automatic means under control of said arm and stud for actuating said mechanism when the arm registers with the stud.

11. In combination with a weighing machine having a pivotally mounted element movable in accordance with the load thereon, an arm mounted for movement with the element, means for adjustably fixing the position of said arm relative to that of the element, a fixed stud, mechanism correlated for use with said machine, and automatic means under control of said arm and stud for actuating said mechanism when the arm registers with the stud.

12. In combination with a weighing machine having an element movable in accordance with the load thereon, an arm mounted for movement with the element, an electrode on said arm, a second electrode separated from the first electrode by a variable gap and immersed in an oil bath, mechanism correlated for use with said machine, and electrical means for actuating said mechanism when the electrodes are in a position of approximately minimum gap.

13. In combination with a weighing machine having an element movable in accordance with the load thereon and fixed to a rotatable shaft, an arm journaled for rotation about the shaft, means for fixing the position of the arm relative to that of the element, a stud, a valve correlated for use with said machine, and automatic means under control of said arm and stud for shutting the valve when the arm registers with the stud.

14. In combination with a weighing machine having an element movable in accordance with the load thereon and fixed to a rotatable shaft, an arm journaled for rotation about the shaft, means for fixing the position of the arm relative to that of the element, an electrode on said arm, a second electrode separated from the first electrode by a variable gap, a valve correlated for use with said machine, and electrical means under control of said arm and stud for shutting the valve when the electrodes are in a position of approximately minimum gap.

15. In combination with a weighing machine having an element movable in accordance with the load thereon, an arm mounted for movement with the element, means for adjustably fixing the position of the arm relative to that of the element, a stud, a valve correlated for use with the machine, and automatic means under control of said arm and stud for shutting the valve when the arm registers with the stud.

16. In combination with a weighing machine having an element movable in accordance with the load thereon, an arm mounted for movement with the element, means for adjustably fixing the position of the arm relative to that of the element, a stud, a valve correlated for use with the machine, and electrical means under control of said arm and stud for shutting the valve when the arm registers with the stud.

17. In combination with a weighing machine having an element movable in accordance with the load thereon, an arm mounted for movement with the element, means for adjustably fixing the position of the arm relative to that of the element, a stud, a valve correlated for use with the machine, releasable means for holding the valve open, and automatic means under control of said arm and stud for releasing the holding means to shut the valve when the arm registers with the stud.

18. In combination with a weighing machine having an element movable in accordance with the load thereon, an arm mounted for movement with the element, means for adjustably fixing the position of the arm relative to that of the element, a stud, a valve correlated for use with the machine, a movable latch for holding the valve open, and automatic means under control of said arm and stud for releasing the latch to shut the valve when the arm registers with the stud.

19. In combination with a weighing machine having an element movable in accordance with the load thereon, an arm mounted for movement with the element, means for adjustably fixing the position of the arm relative to that of the element, a stud, a valve correlated for used with the machine, a movable latch for holding the valve open, an armature fixed to the latch, an electromagnet for attracting the armature, and electrical means for energizing the electromagnet to attract the armature when the arm registers with the stud.

20. In combination with a weighing machine having a dial, an arm movable in accordance with the load of the machine mounted for movement across the face of the dial, means for adjustably fixing the initial position of the arm relative to said dial, a fixed stud on the dial, mechanism correlated for use with said machine, and means under control of said arm and stud for actuating said mechanism when the arm registers with the stud.

21. In combination with a weighing machine having a dial, an arm movable in accordance with the load of the machine mounted for movement across the face of the dial, means for adjustably fixing the initial position of the arm relative to said dial, a fixed stud on the dial, control mechanism correlated for use with said machine, and means under control of said arm and stud for actuating said mechanism when the arm registers with the stud.

22. In combination with a weighing machine having a dial, an arm movable in accordance with the load of the machine mounted for movement across the face of the dial and having an electrode, a second electrode separated from the first electrode by a variable gap, means for adjustably fixing the initial position of the arm relative to said dial, mechanism correlated for use with said machine, and electrical means for actuating said mechanism when the electrodes are in a position of approximately minimum gap.

In testimony whereof, I have hereunto set my hand.

WILLIAM H. REES.